(12) United States Patent
Wholey, III

(10) Patent No.: US 9,354,981 B2
(45) Date of Patent: May 31, 2016

(54) CHECKPOINTING A COLLECTION OF DATA UNITS

(71) Applicant: Ab Initio Technology LLC, Lexington, MA (US)

(72) Inventor: Joseph Skeffington Wholey, III, Belmont, MA (US)

(73) Assignee: Ab Initio Technology LLC, Lexington, MA (US)

( * ) Notice: Subject to any disclaimer, the term of this patent is extended or adjusted under 35 U.S.C. 154(b) by 24 days.

(21) Appl. No.: 14/497,698

(22) Filed: Sep. 26, 2014

(65) Prior Publication Data

US 2015/0113325 A1 Apr. 23, 2015

Related U.S. Application Data

(60) Provisional application No. 61/893,439, filed on Oct. 21, 2013.

(51) Int. Cl.
*G06F 11/07* (2006.01)
*G06F 11/14* (2006.01)

(52) U.S. Cl.
CPC ........ *G06F 11/1448* (2013.01); *G06F 11/1435* (2013.01); *G06F 11/1438* (2013.01)

(58) Field of Classification Search
CPC ............ G06F 11/1435; G06F 11/1469; G06F 11/1471
USPC .......................................................... 714/20
See application file for complete search history.

(56) References Cited

U.S. PATENT DOCUMENTS

| | | | |
|---|---|---|---|
| 5,712,971 A | 1/1998 | Stanfill et al. | |
| 5,819,021 A | 10/1998 | Stanfill et al. | |
| 6,584,581 B1 | 6/2003 | Bay et al. | |
| 7,865,684 B2 | 1/2011 | Michaylov et al. | |
| 8,229,902 B2 | 7/2012 | Vishniac et al. | |
| 8,392,370 B1 | 3/2013 | Whitney et al. | |
| 8,539,179 B1 | 9/2013 | Stringham | |
| 2005/0076264 A1* | 4/2005 | Rowan ................ | G06F 11/1469 714/6.12 |
| 2006/0101025 A1* | 5/2006 | Tichy ................ | G06F 17/30067 |
| 2006/0173930 A1 | 8/2006 | Soini et al. | |
| 2008/0178185 A1* | 7/2008 | Okada ................. | G06F 11/1469 718/103 |
| 2014/0040213 A1 | 2/2012 | Rossi | |
| 2012/0216073 A1 | 8/2012 | Douros et al. | |

(Continued)

FOREIGN PATENT DOCUMENTS

WO WO 01/42920 6/2001

OTHER PUBLICATIONS

International Search Report, PCT Application No. PCT/US2014/057624, mailed Jan. 15, 2015 (3 pages).

*Primary Examiner* — Chae Ko
(74) *Attorney, Agent, or Firm* — Occhiuti & Rohlicek LLP

(57) ABSTRACT

A memory module stores working data that includes data units. A storage system stores recovery data that includes sets of one or more data units. Transferring data units between the memory module and the storage system includes: maintaining an order among the data units included in the working data, the order defining a first contiguous portion and a second contiguous portion; and, for each of multiple time intervals, identifying any data units accessed from the working data during the time interval, and adding to the recovery data a set of two or more data units including: one or more data units from the first contiguous portion including any accessed data units, and one or more data units from the second contiguous portion including at least one data unit that has been previously added to the recovery data.

67 Claims, 11 Drawing Sheets

(56) References Cited

U.S. PATENT DOCUMENTS

2013/0226931 A1* 8/2013 Hazel ............... G06F 17/30094
    707/741

2014/0082261 A1* 3/2014 Cohen ................... G11C 16/06
    711/103

2014/0108723 A1* 4/2014 Nowoczynski ..... G06F 12/0866
    711/113

* cited by examiner

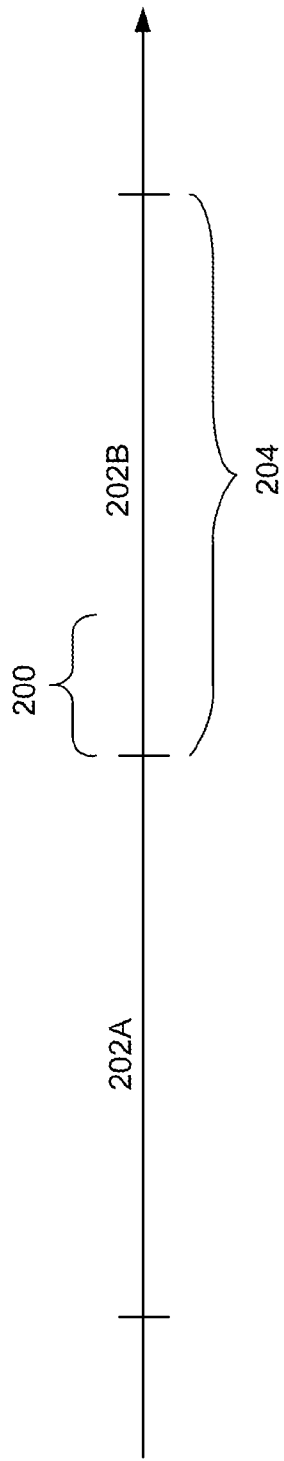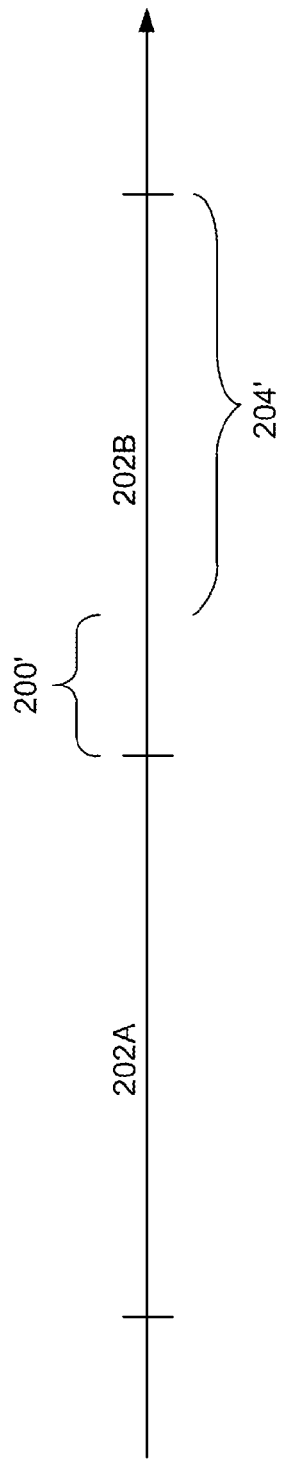

400 ↘

| Key | Data | CPN |
|---|---|---|
| 1220 | A | |
| 1218 | B | |
| 1217 | C | |
| 1216 | D | |
| ⋮ | ⋮ | ⋮ |
| 1210 | E | 200 |
| 1209 | F | 200 |
| 1231 | G | 200 |
| ⋮ | ⋮ | ⋮ |
| 1232 | H | 194 |
| 1002 | Z | 194 |
| 1238 | I | 194 |
| 1239 | J | 193 |
| 1259 | K | 193 |
| 1203 | L | 200 |
| 1201 | M | 200 |
| ⋮ | ⋮ | ⋮ |
| 1244 | N | 198 |

MRA → row 1220
MRC → row after 1216
LRC → row 1259
LRA → row 1244

402 ↘

| Key |
|---|
| 1245 |
| 1215 |

FIG. 4A

| CHECKPOINT FILE 193 | Type | Key | Data | New? |
|---|---|---|---|---|
| | E | 1259 | K | T |
| | E | 1239 | J | F |
| | E | 1238 | Q | T |
| | E | 1232 | S | F |
| | E | 1911 | X | T |
| | . | . | . | . |
| | . | . | . | . |
| | . | . | . | . |
| | R | 1110 | | |
| | L | 1237 | | |

| CHECKPOINT FILE 194 | Type | Key | Data | New? |
|---|---|---|---|---|
| | E | 1238 | I | T |
| | E | 1237 | R | F |
| | E | 1232 | T | T |
| | E | 1911 | Y | F |
| | E | 1232 | H | T |
| | . | . | . | . |
| | . | . | . | . |
| | . | . | . | . |
| | R | 1710 | | |
| | R | 1810 | | |
| | L | 1211 | | |

FIG. 4B

| CHECKPOINT FILE 198 | Type | Key | Data | New? |
|---|---|---|---|---|
| | . | . | . | . |
| | . | . | . | . |
| | . | . | . | . |
| | E | 1244 | N | F |
| | . | . | . | . |
| | . | . | . | . |
| | . | . | . | . |
| | L | 1222 | | |

| CHECKPOINT FILE 199 | Type | Key | Data | New? |
|---|---|---|---|---|
| | . | . | . | . |
| | . | . | . | . |
| | . | . | . | . |
| | R | 1910 | | |
| | R | 1911 | | |
| | L | 1201 | | |

| CHECKPOINT FILE 200 | Type | Key | Data | New? |
|---|---|---|---|---|
| | E | 1231 | G | T |
| | E | 1201 | M | F |
| | E | 1209 | F | T |
| | E | 1203 | L | F |
| | E | 1210 | E | T |
| | . | . | . | . |
| | . | . | . | . |
| | . | . | . | . |
| | R | 1237 | | |
| | L | 1259 | | |

FIG. 4C

CHECKPOINT FILE 201

| Type | Key | Data | New? |
|---|---|---|---|
| E | 1216 | D | T |
| E | 1259 | K | F |
| E | 1217 | C | T |
| E | 1239 | J | F |
| E | 1218 | B | T |
| E | 1238 | I | F |
| E | 1220 | A | T |
| E | 1002 | Z | F |
| . | . | . | . |
| . | . | . | . |
| . | . | . | . |
| R | 1245 | | |
| R | 1915 | | |
| L | 1232 | | |

|  | Key | Data | CPN |
|---|---|---|---|
| MRC, MRA → | 1220 | A | 201 |
|  | 1218 | B | 201 |
|  | 1217 | C | 201 |
|  | 1216 | D | 201 |
|  | ⋮ | ⋮ | ⋮ |
|  | 1210 | E | 200 |
|  | 1209 | F | 200 |
|  | 1231 | G | 200 |
|  | ⋮ | ⋮ | ⋮ |
| LRC → | 1232 | H | 194 |
|  | 1002 | Z | 201 |
|  | 1238 | I | 201 |
|  | 1239 | J | 201 |
|  | 1259 | K | 201 |
|  | 1203 | L | 200 |
|  | 1201 | M | 200 |
|  | ⋮ | ⋮ | ⋮ |
| LRA → | 1244 | N | 198 |

402

| Key |
|---|
| (empty) |

FIG. 4E

AFTER 194:

| Key | Data | CPN |
|---|---|---|
| . | . | . |
| . | . | . |
| . | . | . |
| 1232 | H | 194 |
| 1232 | T | 194 |
| 1238 | I | 194 |
| 1211 | Y | 194 |
| 1237 | R | 194 |

AFTER 198:

| Key | Data | CPN |
|---|---|---|
| . | . | . |
| . | . | . |
| . | . | . |
| 1232 | H | 194 |
| 1237 | R | 194 |
| . | . | . |
| . | . | . |
| . | . | . |
| 1244 | N | 198 |

AFTER 199:

| Key | Data | CPN |
|---|---|---|
| . | . | . |
| . | . | . |
| . | . | . |
| 1232 | H | 194 |
| 1237 | R | 194 |
| 1238 | I | 194 |
| . | . | . |
| . | . | . |
| . | . | . |
| 1244 | N | 198 |

AFTER 200:

| Key | Data | CPN |
|---|---|---|
| 1210 | E | 200 |
| 1209 | F | 200 |
| 1231 | G | 200 |
| . | . | . |
| . | . | . |
| 1232 | H | 194 |
| 1238 | I | 194 |
| 1203 | L | 200 |
| 1201 | M | 200 |
| . | . | . |
| . | . | . |
| 1244 | N | 198 |

FIG. 4F

CHECKPOINTING A COLLECTION OF DATA UNITS

CROSS-REFERENCE TO RELATED APPLICATIONS

This application claims priority to U.S. Application Ser. No. 61/893,439, filed on Oct. 21, 2013, incorporated herein by reference.

BACKGROUND

This description relates to checkpointing a collection of data units.

There are various types of data processing systems in which the ability to recover or restart in response to a failure or other unexpected event is useful. For example, in real-time stream processing or complex event processing systems, it is useful to save system information such as input data and/or state information for computations being performed on the input data. Checkpointing is an example of a way to periodically save system information so that the system is able to recover from a recently saved consistent state. One example of a checkpointing technique for a data processing system that operates on a continuous flow of data is described in U.S. Pat. No. 6,584,581, incorporated herein by reference.

SUMMARY

In one aspect, in general, a computing system for managing stored data includes: a memory module configured to store working data that includes a plurality of data units; a storage system configured to store recovery data that includes a plurality of sets of one or more data units; and at least one processor configured to manage transfer of data units between the memory module and the storage system. The managing includes: maintaining an order among the plurality of data units included in the working data, the order defining a first contiguous portion including one or more of the plurality of data units and a second contiguous portion including one or more of the plurality of data units; and, for each of multiple time intervals, identifying any data units accessed from the working data during the time interval, and adding to the recovery data a set of two or more data units including: one or more data units from the first contiguous portion including any accessed data units, and one or more data units from the second contiguous portion including at least one data unit that has been previously added to the recovery data.

Aspects can include one or more of the following features.

The managing further includes, for each of multiple intervals of time, removing from the recovery data at least one set of one or more data units for which any data units still included in the working data are stored in at least one other set of one or more data units.

The managing further includes, for each of the multiple time intervals, identifying any data units removed from the working data during the time interval.

The second contiguous portion excludes any removed data units.

The managing further includes, for each of multiple intervals of time, adding to the recovery data information identifying any removed data units.

Identifying any data units accessed from the working data during the time interval includes moving any data units accessed from the working data during the time interval into the first contiguous portion.

The order among the plurality of data units included in the working data is based on how recently the data units have been accessed.

The first contiguous portion includes: a most-recently-accessed data unit of all of the plurality of data units included in the working data, and a least-recently-accessed data unit of a subset of the plurality of data units that have not been added to the recovery data since their most-recent access.

The second contiguous portion does not overlap with the first contiguous portion.

The second contiguous portion includes at least one data unit that has been added to the recovery data since its most-recent access.

The one or more data units from second contiguous portion is limited to a number of data units that is between about half the number of data units in the one or more data units from the first contiguous portion and about twice the number of data units in the one or more data units from the first contiguous portion.

The first contiguous portion includes data units that have been more recently accessed than any of the data units in the second contiguous portion.

A time indicating how recently a data unit has been accessed corresponds to a time at which exclusive access to the data unit was initiated.

A time indicating how recently a data unit has been accessed corresponds to a time at which exclusive access to the data unit was concluded.

The managing further includes using the recovery data to restore a state of the working data in response to a failure.

The plurality of data units included in the working data are each associated with a key value.

At least one of the data units included in the working data includes one or more values accessible based on the key value associated with the data unit.

The total number of different key values associated with different data units included in the working data is larger than about 1,000.

The time intervals do not overlap with each other.

Identifying any data units accessed from the working data during the time interval includes identifying at least one of: any data units added to the working data during the time interval, any data units read from the working data during the time interval, or any data units updated within the working data during the time interval.

The memory module includes a volatile memory device.

The storage system includes a non-volatile storage device.

In another aspect, in general, a computing system for managing stored data includes: a memory module configured to store working data that includes a plurality of data units; a storage system configured to store recovery data that includes a plurality of sets of one or more data units; and means for managing transfer of data units between the memory module and the storage system. The managing includes: maintaining an order among the plurality of data units included in the working data, the order defining a first contiguous portion including one or more of the plurality of data units and a second contiguous portion including one or more of the plurality of data units; and, for each of multiple time intervals, identifying any data units accessed from the working data during the time interval, and adding to the recovery data a set of two or more data units including: one or more data units from the first contiguous portion including any accessed data units, and one or more data units from the second contiguous portion including at least one data unit that has been previously added to the recovery data.

In another aspect, in general, a method for managing transfer of data units between a memory module of a computing system and a storage system of the computing system includes: storing, in the memory module, working data that includes a plurality of data units; storing, in the storage system, recovery data that includes a plurality of sets of one or more data units; maintaining an order among the plurality of data units included in the working data, the order defining a first contiguous portion including one or more of the plurality of data units and a second contiguous portion including one or more of the plurality of data units; and, for each of multiple time intervals, identifying any data units accessed from the working data during the time interval, and adding to the recovery data a set of two or more data units including: one or more data units from the first contiguous portion including any accessed data units, and one or more data units from the second contiguous portion including at least one data unit that has been previously added to the recovery data.

In another aspect, in general, software is stored in a non-transitory form on a computer-readable medium, for managing transfer of data units between a memory module of a computing system and a storage system of the computing system. The software includes instructions for causing the computing system to: store, in the memory module, working data that includes a plurality of data units; store, in the storage system, recovery data that includes a plurality of sets of one or more data units; maintain an order among the plurality of data units included in the working data, the order defining a first contiguous portion including one or more of the plurality of data units and a second contiguous portion including one or more of the plurality of data units; and, for each of multiple time intervals, identify any data units accessed from the working data during the time interval, and add to the recovery data a set of two or more data units including: one or more data units from the first contiguous portion including any accessed data units, and one or more data units from the second contiguous portion including at least one data unit that has been previously added to the recovery data.

Aspects can include one or more of the following advantages.

In some data processing systems, the information maintained by the system includes working data that includes a collection of data units that are being regularly updated as processing proceeds. In complex event processing (CEP) systems, for example, streams of events are processed and aggregated, while, concurrently, actions are taken based on the results. A set of working data for a CEP system may include state for multiple data units that represent entities for which different respective streams of data are being received, such as prices associated with different stock symbols. The state represented by a particular data unit may be stored in as a state object that is accessible by a unique key (e.g., a numerical value). In the stock symbol example, the system would maintain one state object per stock symbol. Each state object may have one or more fields that store values such as: scalars (e.g., for values associated with the stock), vectors (e.g., historical price data). In some examples, fields of a state object may store computed values representing results of applied functions, such as an aggregation function (e.g., sums, counts, maxima, and averages), incrementally updated for each new price value for the corresponding stock symbol. There may be multiple collections of state objects within a system, and each collection may include state objects with a particular set of fields. A collection may change in size, with new state objects being added and old stage objects being removed, but most of the changing data in a collection may be due to the actual data stored within some fraction of the state objects being updated.

In some implementations, the working data for the system is stored in a large amount of relatively fast memory, which may be volatile memory (e.g., Dynamic Random Access Memory (DRAM)). It may be particularly useful, in order to ensure the durability of the working data, to use a checkpointing scheme to regularly store the latest version of each state object into a more stable and reliable storage device (e.g., a hard disk drive, solid state drive, or other non-volatile storage medium), while at the same time ensuring that the cost in terms of required resources (e.g., data transfer time, and data storage space) are efficiently managed. While the working data may include a large number of data units (such as the state objects described above), in any given time period between checkpoint operations (called a "checkpoint interval"), a small fraction of those data units may change. The checkpointing scheme should enable the most recent state of each data unit to be recovered in case of a failure, including those data units that have changed recently and those that have not.

Techniques for efficiently checkpointing in such systems can be challenging especially when the number of data units being managed is particularly large. For example, in one scenario, the working data includes a collection of about a billion data units of a few bytes each, and during each checkpoint interval about one tenth of one percent (1 million data units) are changed. Of course, at each checkpoint interval, the set of data units that have changed may be a different (but possibly overlapping) set. For recovery, it is also assumed that only the most recent state of any particular data unit would be needed.

A first approach would be to store the entire collection of data units to the storage device at each checkpoint interval into a respective checkpoint file. To recover the latest state of each data unit in that collection, the system could simply read the checkpoint file(s). This first approach could be prohibitive in terms of data transfer cost—with gigabytes of working data and a checkpoint interval of seconds, there may not even be enough time to write all of the data units to the storage device.

A second approach would be to store just the data units that have changed since the last checkpoint interval to the storage device at each checkpoint interval into a respective checkpoint file. While this second approach reduces the transfer time at each checkpoint, recovery becomes ever more expensive as time goes on, since to recover the latest state of each data unit the system would need to read every checkpoint file from the beginning of the checkpointing process in order to ensure that the latest state of some data unit that may not have changed since the first checkpoint file was written is recovered.

A possible refinement of the second approach would be for the system to execute an off-line process that scans the checkpoint files in the storage device and removes checkpoint files that consist entirely of old copies of data units that have newer state represented in more recently-stored checkpoint files. Another refinement of the second approach would be for the process to scan checkpoint files and rewrite checkpoint files to remove such old copies of data units, leaving at least one more recent copy of each removed data unit in at least one newer checkpoint file. When a checkpoint file drops to zero data units, it could be removed from the storage device to free storage space. Some potential challenges for this refinement are that (a) the consolidation process introduces another process to be managed, which may make the system less reliable in general, and (b) the consolidation process has a cost in computation time, which includes at least one pass of reading the checkpoint data represented in the checkpoint files, but which could include several passes of reading and writing the checkpoint data.

A third approach would be for the system to store a separate checkpoint file for every data unit. In each checkpoint interval, any new checkpoint file written for a particular updated data unit could replace the previous checkpoint file for that data unit. This would avoid prohibitive data transfer cost (since only changed entries would need to be stored), and would avoid prohibitive data storage cost (since checkpoint files of mostly-outdated data would not accumulate indefinitely), and would reduce complexity (since it would not require a clean-up process). However, a potential reason that this third approach could be prohibitively costly is that files are relatively expensive with respect to storage space. If the working data consists of billions of data units of just a few bytes each, the file system could be overwhelmed with file creation and management operations, and overhead storage space for file system metadata could end up consuming more storage space than the actual content of the data units.

Some of the techniques for checkpointing described below have at least some of the advantages of the approaches and refinements above. For example, the data storage cost (including file system overhead) and data transfer time can be limited, based on the recognition that the recovery data can include, within the same checkpoint file, both new copies of potentially changed data units and old copies of data units previously added to a (different) checkpoint file. This process of migrating old copies into newer checkpoint files incrementally can be done in a way that limits the amount of extra work being done in a checkpoint interval, and gradually consolidates older copies of less-recently-accessed data units until old checkpoint files can be discarded since they store only redundant backup copies of data units. This consolidation process can be performed by the same checkpointing process that stores the checkpoint files, and therefore potentially simpler and more reliable than an off-line consolidation process. Even without removing old checkpoint files, storing the latest state for multiple data units (i.e., data units with different keys) in the same checkpoint file reduces potential data storage cost due to file system overhead, especially when the number of different keys assigned to data units is large (e.g., larger than about 1,000 or larger than about 1,000,000 or larger than about 1,000,000,000).

Other features and advantages of the invention will become apparent from the following description, and from the claims.

DESCRIPTION OF DRAWINGS

FIGS. 2A and 2B are timelines of checkpointing and data processing operations.

FIGS. 4A, 4E, and 4F are schematic diagrams of working data state.

FIGS. 4B, 4C, and 4D are schematic diagrams of checkpoint files.

DESCRIPTION

Figure 1:
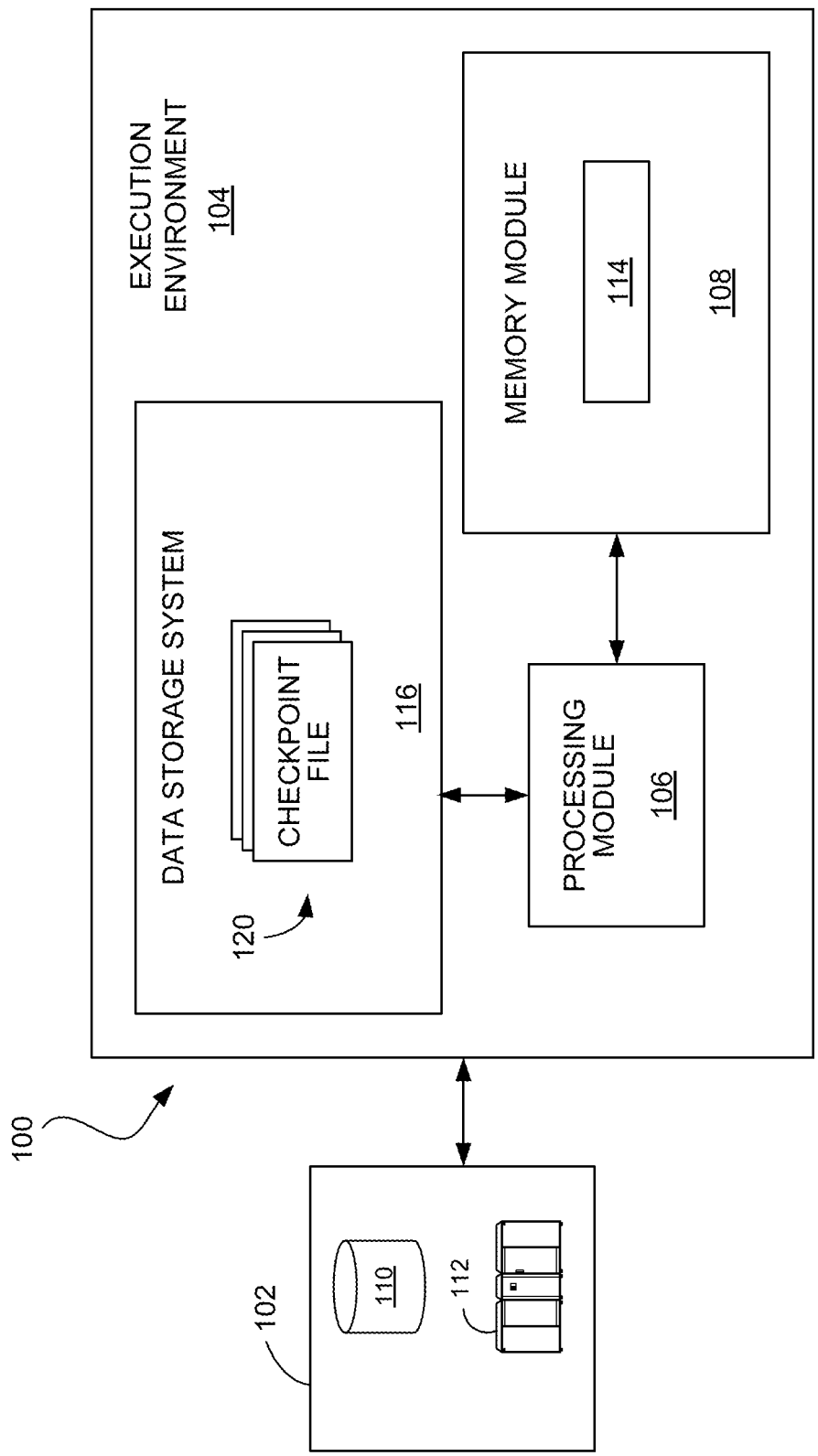
FIG. 1 is a block diagram of a data processing system.

FIG. 1 shows an example of a data processing system 100 in which the checkpointing techniques can be used. The system 100 includes a data source 102 that may include one or more sources of data such as storage devices or online data sources, each of which may store or provide data in any of a variety of formats (e.g., database tables, spreadsheet files, flat text files, or a native format used by a mainframe). An execution environment 104 includes a processing module 106 (e.g., at least one central processing unit with one or more processing cores) and a memory module 108 (e.g., one or more memory devices, such as DRAM or other form of relatively fast memory medium). The execution environment 104 may be hosted, for example, on one or more general-purpose computers under the control of a suitable operating system, such as a version of the UNIX operating system. For example, the execution environment 104 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

Storage devices providing the data source 102 may be local to the execution environment 104, for example, being stored on a storage medium 110 connected to a computer hosting the execution environment 104, or may be remote to the execution environment 104, for example, being hosted on a remote system (e.g., mainframe 112) in communication with a computer hosting the execution environment 104, over a remote connection (e.g., a server connection streaming a data feed). The output data generated from data processing within the execution environment 104 may be stored back in the data source 102 or other storage medium, or otherwise used.

The processing module 106 processes data from the data source 102 for any of a variety of applications (e.g., complex event processing), and during the processing accesses working data 114 stored in the memory module 108. The processing module 106 also periodically executes a checkpointing process that stores portions of the working data 114 to a data storage system 116 accessible within the execution environment 104 (e.g., a hard drive of a computer hosting the execution environment 104). The checkpointing process may store certain portions of the working data 114 in their entirety, while other portions are only selectively stored to avoid redundantly backing up certain data that has not changed since the last checkpoint interval. For example, the working data 114 may include a set of data units that the checkpointing process selectively stores in a set of checkpoint files 120 according an order maintained among the data units. Other portions of the working data 114, such as other in-memory state associated with the data processing, may be stored in a separate checkpoint file.

The order among the data units is maintained by a management program, which may be part of a larger data processing program, or may be a separate process that manages the working data 114. In some implementations, the data units are stored in the memory module 108 within an associative array of key-value pair entries organized in least-recently-accessed (LRA) to most-recently-accessed (MRA) order. For example, the associative array can be implemented as a hash table, and the entries in the table can be threaded together using a doubly-linked list pointer arrangement according to the maintained order. Each entry in the table is accessed based on a unique key, and is able to store data corresponding to that key (representing any number of individual values of variables or other state information) within an enclosing data object such as the keyed state objects described above. The management program maintains an MRA pointer that points to the MRA entry in the table, and an LRA pointer that points to the LRA entry in the table. The management program also maintains a least-recently-checkpointed (LRC) pointer, and a most-recently-checkpointed (MRC) pointer. Each entry in the table also has an associated property that stores a checkpoint number (CPN) corresponding to a checkpoint file in which it was last saved (if any). These pointers and fields are used to selectively determine which of the entries will be copied to a new checkpoint file in any given checkpoint interval, as described in more detail below.

Each time an entry is accessed, it becomes the most-recently-accessed entry—i.e., the MRA pointer is assigned to the memory address of that entry and other pointers within the linked list (e.g., for neighboring entries at its old location in the table) are adjusted appropriately. In some implementations, an entry is considered to have been accessed in any instance in which the entry's key is used to retrieve the data stored in that entry, or when the entry has been added to the table. In such implementations, when a program retrieves an entry's data to read it without changing it, the entry is still considered to have been accessed. In some implementations, the management program maintains an order based on when an entry has actually changed (e.g., most-recently changed or least-recently-changed) and does not consider reading an entry's data without changing it to affect the order. Such implementations could use a "dirty bit" for each entry that has had its data changed by an access of that entry, for example. In the examples below, a simpler scheme of assuming that any access could possibly have changed the data stored in an entry is used. The management program also determines when entries are no longer needed and should be removed from the table. For example, in some implementations, when memory or time constraints dictate, entries are removed from the table starting with the least-recently-accessed entry.

The data processing system 100 provides an incremental checkpointing scheme by executing the checkpointing process at regular checkpoint intervals. For example, the checkpointing process may be triggered after a predetermined amount of time, or after the system receives a predetermined number of input records. When the checkpointing process is triggered, it stores a checkpoint file with "new" copies of data units that have been accessed during the most recent checkpoint interval and a similar number of "old" copies of data units that have not been accessed during the most recent checkpoint interval and have already been stored in a checkpoint file, adjusting the MRC pointer as described in more detail below. These checkpointing operations performed by the checkpointing process may occur while the management program continues to manage access to the working data 114 for data processing operations, or may temporarily block access to the working data 114 while the checkpointing process executes. FIGS. 2A and 2B show timelines (where time increases to the right) for examples of timing of checkpoint processing operations for the most recent checkpoint interval. In the example of FIG. 2A, the checkpointing process performs checkpointing operations 200 for saving working data state of activity that occurred during a previous checkpoint interval 202A, concurrently with data processing operations 204 that continue during the checkpoint interval 202B. Alternatively, in the example of FIG. 2B, the checkpointing process completes checkpointing operations 200' for activity that occurred during the previous checkpoint interval 202A before data processing operations 204' resume during the checkpoint interval 202B. In order to enable proper reconstruction of the working data 114 during recovery, the checkpointing process stores the data units in a manner that enables the new copies to be distinguished from the old copies (e.g., using a flag for each data unit, or writing the data units to the checkpoint file in separate sections). Since the checkpointing process writes old data units to newer checkpoint files, it can remove the checkpoint files that previously stored those data units (which are now stored in the newer checkpoint files) when certain conditions are met, as described in more detail below.

As the management program manages access to the working data 114 during normal data processing, it updates the MRA and MRC pointers appropriately to prepare for the checkpointing process that will occur at the next checkpoint interval. For example, for the table of entries described above organized as a linked list, if the MRC entry is accessed it becomes the MRA entry at one end of the table, and the MRC pointer is adjusted to refer to the entry one step towards the LRA end of the table. When the next checkpointing process occurs, only the entries between MRA (inclusive) and MRC (exclusive) pointers need to be stored. After the entries between MRC pointer and the MRA pointer are stored to a checkpoint file, the checkpointing process sets the MRC pointer to the entry identified by the MRA pointer to prepare for the next checkpoint interval.

Another aspect of managing the working data 114 and the checkpoint files 120 that relates to proper reconstruction of the table during recovery is tracking data units (e.g., table entries) that have been removed from the working data 114 (or are indicated as being no longer in use). For purposes of unambiguously identifying each data unit that has existed since the beginning of the data processing, including those that have been removed, a unique identifier (ID) is assigned to each data unit. Since the keys for the entries in the table are unique, they can be used as this unique ID as long as keys for removed entries are not reused. Otherwise, if keys are reused, another unique ID can be assigned to each entry. In the following examples, an 8-byte integer that is incremented each time a new entry is added to the table will serve as both this unique ID and the entry's key. When an entry is removed from the table during a checkpoint interval, the management program adds its ID to a list of removed entries for that checkpoint interval, which it stores as part of the checkpoint file.

So, a checkpoint file for a particular checkpoint interval may include a data structure (e.g., a table) storing the following two types of items:

(1) items storing the keys of entries that were removed since the last checkpoint interval, and (2) items storing copies of the entries (both the key and the corresponding data) accessed since the last checkpoint interval.

One possible recovery procedure includes reading every checkpoint file in order of their creation. For each checkpoint file, a recovery process executed by the processing module 106 would perform the following steps:

(1) remove any entries whose key is stored in an item of type (1) of the checkpoint file, and then (2) add or update the entries stored in an item of type (2) of the checkpoint file.

While reading every checkpoint file from the first checkpoint file ever stored will lead to correct behavior, there are improvements that can be made so that the recovery process is not required to read every checkpoint file and replay every change to the table from the beginning of the checkpointing at recovery time. By incrementally copying entries that have previously been copied into old checkpoint files into new checkpoint files, the checkpointing process is eventually able to remove older checkpoint files that are no longer needed. This enables a quicker recovery process, and reduces the data storage cost.

In order to ensure that old checkpoint files can be safely removed without losing any saved state that would be necessary for recovering the most recent state of each entry in the table (as of the most recently completed checkpoint interval), the management program and the checkpointing process together enable the LRC pointer to incrementally sweep the able entries from the LRA end towards the MRA end to keep track of which old entries have been copied into newer checkpoint files. For each checkpoint interval, the checkpointing process saves as many old entries from the LRA end as it saves new entries from the MRA end. In this way, the checkpointing process limits the data transfer cost to be proportional to the number of entries accessed since the last checkpoint interval. As the checkpointing process writes old entries from the LRA end into newer checkpoint files, it can delete the checkpoint files they were previously a part of as long as those checkpoint files do not also store old entries that have not yet been copied into a newer checkpoint file. The recovery is then able to restore the most recent table by reading the remaining checkpoint files in oldest-to-newest order.

When the data processing system 100 starts processing data and managing the working data 114 stored in the memory module 108, there may be an initial number of checkpointing intervals in which an initial checkpointing process builds up an initial set of one or more checkpoint files 120 with only new data units. For example, this initial checkpointing process stores new entries at the MRA end of the table between the MRC pointer (exclusive) and the MRA pointer (inclusive). The LRC pointer is not used for this initial checkpointing process. After some number of initial checkpoint files 120 have been stored, a normal (steady state) checkpointing process starts that also stores old data units (i.e., table entries) as well as new data units. When the normal checkpointing process starts, the LRC pointer is initially set to the LRA pointer. The checkpointing process will then store a limited number of old entries at the LRA end of the table between the LRC pointer (inclusive) and the MRC pointer (exclusive), or from the LRC pointer (inclusive) to the number of new entries checkpointed, whichever is fewer.

The following example of an algorithm used by the checkpointing process, written in pseudo-code. The pseudo-code includes comments that describe the functionality of the pseudo-code statements and functions. The pseudo-code uses standard C programming language syntax for conditional statements (e.g., 'if' statements) and loops (e.g., 'while' and 'for' loops), and for comments (preceded by a prefix '//'). In this pseudo-code listing, the MRA pointer is in a variable 'mra', the LRA pointer is in a variable 'lra', the MRC pointer is in a variable 'mrc', and the LRC pointer is in a variable 'lrc'. Dot notation is used with these variables to represent portions of the entries identified by these pointers. In particular, the dot notation 'pointer.prev' and 'pointer.next' are used to represent the locations in the table one step closer to the MRA and LRA ends, respectively, from the entry pointed to by 'pointer'; and the dot notation 'pointer.checkpoint_number' and 'pointer.key' and 'pointer.data' are used to represent the CPN and key and data, respectively, of the entry pointed to by 'pointer'. The dot notation is also used to represent calling certain functions associated with the variables, such as 'item.is_<property>( )' to test whether the item represented by the variable 'item' has the property '<property>'. The following algorithm may be executed by the checkpointing process for each checkpoint interval.

```
// Start with an empty list of checkpoint files to remove
files_to_remove = empty_list( );
// Open a new (empty) checkpoint file
// (named with current checkpoint number)
checkpoint_file = open_checkpoint_file(checkpoint_number);
// Advance MRC pointer (to find first new entry)
mrc = mrc.prev;
// A while-loop copies all the entries accessed
// during the most recent checkpoint interval
// and equal number of old entries:
while (mrc != mra) {
  // Write the current new entry to the current checkpoint file
  // setting 'New?' to true
  write(checkpoint_file, checkpointed_entry(mrc, true));
  // Record the checkpoint number into current new entry
  mrc.checkpoint_number = checkpoint_number;
  // Advance MRC pointer
  mrc = mrc.prev;
  // If LRC has not caught up to MRC ...
  if (lrc != mrc) {
    // ... write the LRC entry to the current checkpoint file
    // setting 'New?' to false
    write(checkpoint_file, checkpointed_entry(lrc, false));
    // If the LRC entry was the most recent entry in its
    // old checkpoint file, then remove that file
    if (lrc.checkpoint_number != lrc.prev.checkpoint_number)
      files_to_remove.add(lrc.checkpoint_number);
    // Record the new checkpoint number
    lrc.checkpoint_number = checkpoint_number;
    // Advance LRC pointer
    lrc = lrc.prev;
  }
}
// MRC is now MRA (from while loop exit)
// If LRC caught up to MRC, set it back to LRA
if (lrc == mrc)
  lrc = lra;
// Record removal-type items with keys of all entries removed this interval:
for (key in removed_keys)
  write(checkpoint_file, checkpointed_removal(key));
// Record LRC-type item with the LRC key:
write(checkpoint_file, checkpointed_lrc(lrc.key));
// Advance the checkpoint number
checkpoint_number++;
// Remove files listed for removal
for (file in files_to_remove)
  remove_checkpoint_file(file);
```

Figure 3A:
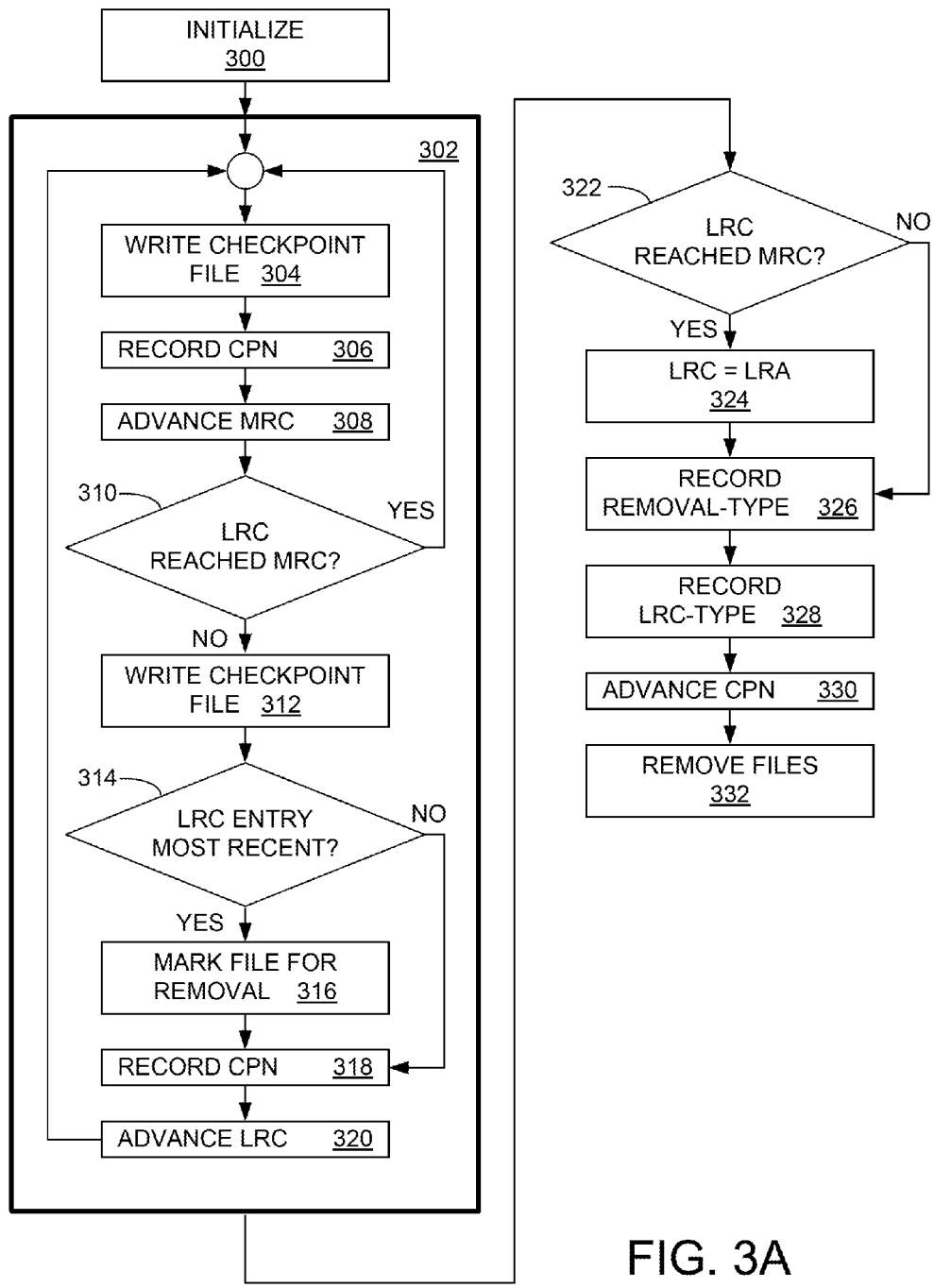
FIGS. 3A and 3B are flowcharts of checkpointing and recovery algorithms, respectively.

The algorithm above is also represented in the flowchart of FIG. 3A. The checkpointing process initializes 300 the checkpoint files, with an empty list of checkpoint files to remove and a new empty checkpoint file, and the MRC pointer advanced to the first new entry. The process performs a while-loop 302 with a loop condition that keeps looping until the MRC pointer is equal to the MRA pointer. In the while-loop 302, the process writes 304 the current new entry to the current checkpoint file, records 306 the current CPN into the current MRC entry, and advances 308 the MRC pointer. The process checks 310 to determine if the LRC has reached the MRC, and if so returns for the next while-loop iteration, and if not proceeds. If proceeding in the while-loop 302, the process writes 312 the LRC entry to the current checkpoint file. Then the process checks 314 to determine if the LRC entry was the most recent entry in its old checkpoint file, and if so marks 316 that checkpoint file for removal by adding it to a list of checkpoint files to be removed. The process then records 318 the current CPN into the current LRC entry, and advances 320 the LRC pointer before returning to the next while-loop iteration. After exiting the while-loop 302, the process checks 322 to determine if the LRC has reached the MRC, and if so sets the LRC back to the LRA. The process then records 326 the removal-type items with keys of all entries removed this checkpoint interval, records 328 the LRC-type item, advances 330 the CPN, and removes 332 the checkpoint files that were marked for removal.

The following is an example of an algorithm used by a recovery process, written in pseudo-code. The following algorithm may be executed to recover the most recent consistent state (i.e., most-recently checkpointed state) of the table of entries after a failure.

```
mra = null;
lra = null;
// outer For loop over each checkpoint file (oldest to newest)
for (checkpoint_file in checkpoint_file_list) {
    // inner For loop over each item in the checkpoint file
    for (item in checkpoint_file) {
        // If the item is a removal-type, remove the entry with the
        specified key
        if (item.is_removal( ))
            remove(item.key);
        // If the item is an entry-type, create or update it
        if (item.is_entry( )) {
            // Find (and remove from table) entry with the specified key
            // and update entry with specified data
            // or create the entry with specified key/data if not found
            entry = get_entry(item.key, item.data);
            // Insert the updated/created entry into the appropriate
position of table by setting pointers
            if (item.is_new( )) {
                entry.next = mra;
                if (mra != null)
                    mra.prev = entry;
                mra = entry;
            } else {
                if (lra == null)
                    lra = entry;
                else {
                    lra.prev = entry;
                    entry.next = lra;
                }
            }
        }
        // If the item is the LRC-type item with LRC key, set LRC
        if (item.is_lrc( ))
            lrc = get_entry(item.key);
    }
}
// Set MRC to MRA
mrc = mra;
```

Figure 3B:
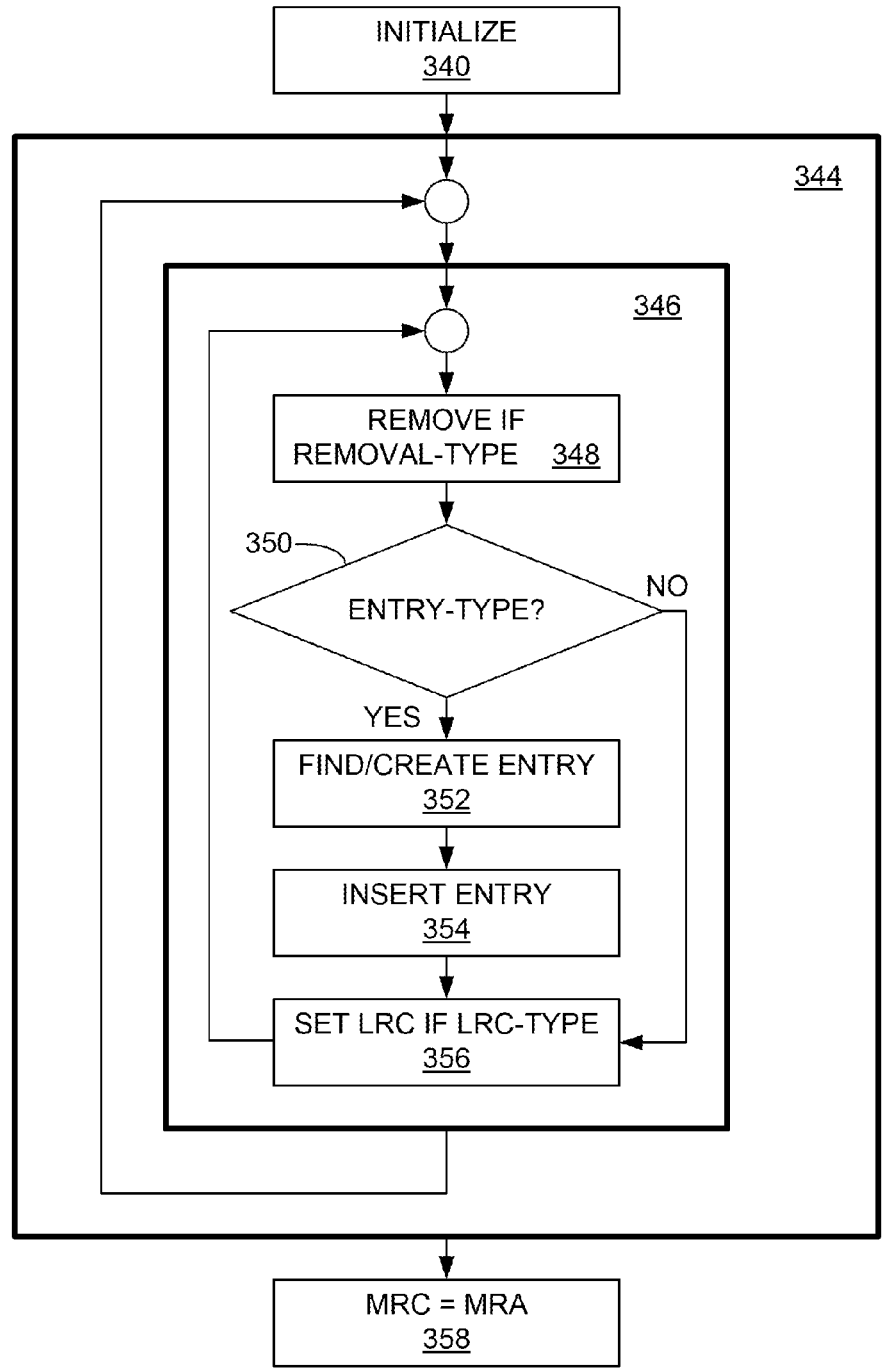

The algorithm above is also represented in the flowchart of FIG. 3B. The recovery process initializes 340 the MRA and LRA pointers to null values. The recovery process then performs nested for-loops, with an outer for-loop 344 that iterates over the checkpoint files (oldest to newest), and an inner for-loop 346 that iterates over the items in each checkpoint file. Inside the inner for-loop 346, the process removes the item if it is a removal-type. The process then checks 350 if the item is an entry-type, and if so finds 352 the entry with the specified key and updates the entry with the specified data or creates the entry with the specified key and data if it is not found. The updated or created entry is then inserted 354 into the appropriate position of the table by setting pointers. After the insertion, or if the item is not an entry-type, the process sets 356 the LRC to the entry with the specified key if it is an LRC-type. Both for-loops then return for the next iterations. After both for-loops exit, the process sets the MRC to the MRA.

Other examples of algorithms that may be used by the checkpointing process may include other steps. For example, the checkpoint files could be compressed. The checkpoint files could be combined into fewer physical files than one per checkpoint interval. For example, there may be a periodic changeover that allows the checkpointing process to remove the older copies of table entries that have newer copies already stored, with a constant-time operation. The ordered list of entries could be maintained on the basis of modification of entries rather than simply access. Rather than recording checkpoint numbers of each of the checkpoint files that are to be removed as the LRC pointer is being advanced, the process could simply remove all checkpoint files associated with checkpoint numbers less than the checkpoint number for the final LRC entry. Rather than interleaving new and old entries within the checkpoint file and using a flag to distinguish them, the process could count the new entries as they are being written and write the same (or a similar) number of old entries after the new entries have been written in separate sections of the checkpoint file (e.g., a section for new entries, a section for old entries, a section for items with removed keys, and a section for the item with the key of the LRC entry).

FIGS. 4A-4F show pictures of examples of different states of the table of entries and other in-memory state within the working data 114, and examples of different states of the checkpoint files 120. FIG. 4A shows portions of a table 400 storing entries of key/data pairs along with a CPN identifying the latest checkpoint file in which that key/data pair is stored, and locations of the MRA, LRA, MRC, and LRC pointers. FIG. 4A also shows a list 402 of removed keys. The table 400 and list 402 are shown for a state just before a checkpointing process generates a checkpoint file with CPN 201. For simplicity, the content of the data for a given key is represented in the illustrated example by a single letter.

FIGS. 4B and 4C show some of the set of existing checkpoint files (with CPNs 193-200) just before the checkpoint file with CPN 201 is generated. FIG. 4B shows earlier checkpoint files 193-194, and FIG. 4C shows latest checkpoint files 198-200. In this example, the checkpoint file is shown as a table with items as rows in the table. Each item has one of three possible values for a 'Type' field: E (entry-type), R (removal-type), or L (LRC-type). An entry-type item has a key value for a 'Key' field; a data value for a 'Data' field; and either T (true) or F (false) for the 'New?' field, which indicates that the entry is a "new" or "old" entry, respectively. As described above, an "old" entry is one that was already stored in a previous checkpoint file, and is now being stored again in a newer checkpoint file. The removal-type and LRC-type items have a key value for the 'Key' field, but do not have values for the 'Data' or 'New?' fields.

Performing the example algorithm described in pseudo-code above, for a checkpoint interval that ended with the table 400 and list 402 as shown in FIG. 4A and the checkpoint files as shown in FIGS. 4B-4C, the checkpointing process would store the new checkpoint file with CPN 201 shown in FIG. 4D. The checkpointing process would also remove checkpoint file with CPN 193, because the transition of the LRC pointer from an entry last checkpointed in that checkpoint file to an entry that was last checkpointed in checkpoint file with CPN 194 indicated that there were no longer any copies of entries needed in the checkpoint file with CPN 193. After the checkpointing process has stored the checkpoint file with CPN 201, and before any entries have had a chance to be accessed since the state of FIG. 4A, the table 400 and list 402 have the state shown in FIG. 4E.

If there is a system failure following storage of the checkpoint file with CPN 201, system is able to perform the recovery process to recover the state of the table 400 and the list 402 (as shown in FIG. 4E) by processing only the remaining checkpoint files (with CPNs 194-201) in order of their CPNs. FIG. 4F shows a series of snapshots of the state of the table 400 as it is being reconstructed. Portions of the state of the table 400 is shown following the processing of the first checkpoint file 194, and following the processing of each checkpoint file 198-200. Then, after processing checkpoint file 201, the fully recovered state of the table 400, including the pointers into the table 400 (as shown in FIG. 4E), is restored. The MRA and MRC pointers are set to the first entry in the table 400, and the LRA pointer is set to the last entry in the table 400. The LRC pointer value is restored using the LRC-type item of the last of the checkpoint files, which in this example is the checkpoint file 201.

Figure 5:
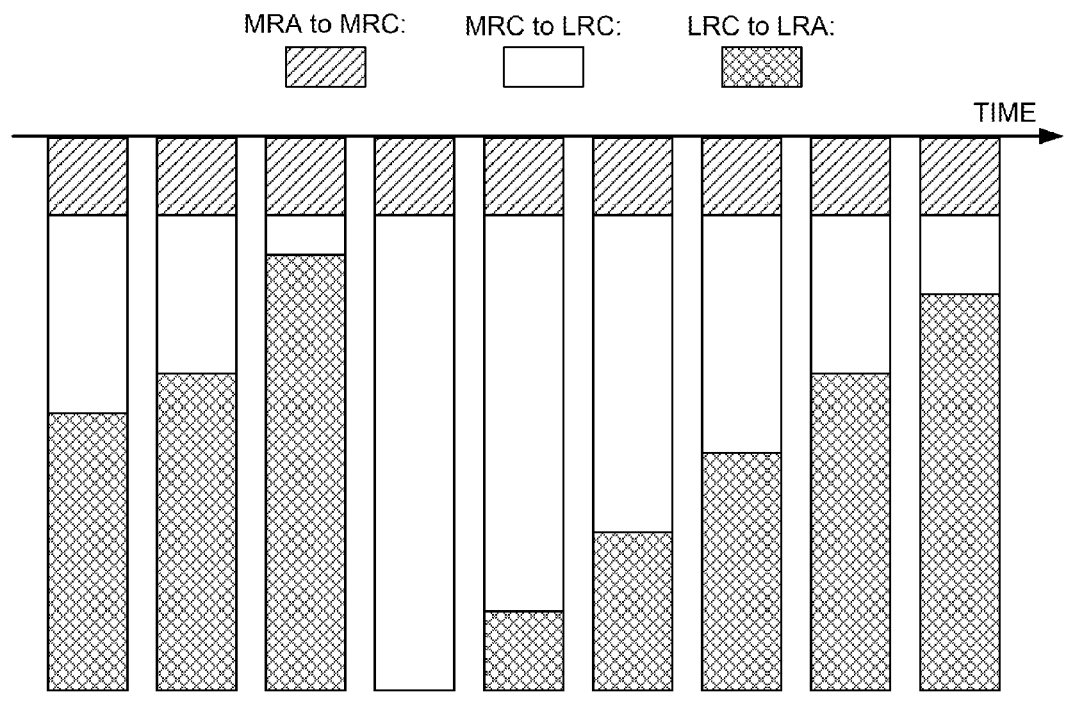
FIG. 5 is a schematic diagram of pointer movement over time.

FIG. 5 shows a depiction of how the different pointers move over time for a series of nine different checkpoint intervals, with a bar for each checkpoint interval textured to represent different sections of a table. The changing sizes of the different sections over time illustrate the LRC pointer catching up to the MRC pointer and cycling back to the LRA pointer. In this example, there is a steady number of data units accessed during this series of checkpoint intervals, and a steady size of the table. Below each bar is a current CPN for the checkpoint file being written for that checkpoint interval, and below the current CPN is a list of the CPNs of the remaining active checkpoint files storing the state of the table (after any old checkpoint files have been removed). In most use cases, including in this example, the set of remaining checkpoint files is fairly stable, with an average of one checkpoint file deletion per checkpoint interval.

The checkpointing approach described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A computing system for managing stored data, the computing system including:
    a memory module configured to store working data that includes a plurality of data units;
    a storage system configured to store recovery data that includes a plurality of sets of one or more data units; and
    at least one processor configured to manage transfer of data units between the memory module and the storage system, the managing including:
        maintaining an order among the plurality of data units included in the working data, the order defining a first contiguous portion including one or more of the plurality of data units and a second contiguous portion including one or more of the plurality of data units; and
        for each of multiple time intervals, identifying any data units accessed from the working data during the time interval, and adding to the recovery data a set of two or more data units including: one or more data units from the first contiguous portion including any accessed data units, and one or more data units from the second contiguous portion including at least one data unit that has been previously added to the recovery data.

2. The computing system of claim 1, wherein the managing further includes, for each of multiple intervals of time, removing from the recovery data at least one set of one or more data units for which any data units still included in the working data are stored in at least one other set of one or more data units.

3. The computing system of claim 1, wherein the managing further includes, for each of the multiple time intervals, identifying any data units removed from the working data during the time interval.

4. The computing system of claim 3, wherein the second contiguous portion excludes any removed data units.

5. The computing system of claim 3, wherein the managing further includes, for each of multiple intervals of time, adding to the recovery data information identifying any removed data units.

6. The computing system of claim 1, wherein identifying any data units accessed from the working data during the time interval includes moving any data units accessed from the working data during the time interval into the first contiguous portion.

7. The computing system of claim 1, wherein the order among the plurality of data units included in the working data is based on how recently the data units have been accessed.

8. The computing system of claim 7, wherein the first contiguous portion includes: a most-recently-accessed data unit of all of the plurality of data units included in the working data, and a least-recently-accessed data unit of a subset of the plurality of data units that have not been added to the recovery data since their most-recent access.

9. The computing system of claim 8, wherein the second contiguous portion does not overlap with the first contiguous portion.

10. The computing system of claim 9, wherein the second contiguous portion includes at least one data unit that has been added to the recovery data since its most-recent access.

11. The computing system of claim 10, wherein the one or more data units from second contiguous portion is limited to a number of data units that is between about half the number of data units in the one or more data units from the first contiguous portion and about twice the number of data units in the one or more data units from the first contiguous portion.

12. The computing system of claim 11, wherein the first contiguous portion includes data units that have been more recently accessed than any of the data units in the second contiguous portion.

13. The computing system of claim 1, wherein a time indicating how recently a data unit has been accessed corresponds to a time at which exclusive access to the data unit was initiated.

14. The computing system of claim 1, wherein a time indicating how recently a data unit has been accessed corresponds to a time at which exclusive access to the data unit was concluded.

15. The computing system of claim 1, wherein the managing further includes using the recovery data to restore a state of the working data in response to a failure.

16. The computing system of claim 1, wherein the plurality of data units included in the working data are each associated with a key value.

17. The computing system of claim 16, wherein at least one of the data units included in the working data includes one or more values accessible based on the key value associated with the data unit.

18. The computing system of claim 16, wherein the total number of different key values associated with different data units included in the working data is larger than about 1,000.

19. The computing system of claim 1, wherein the time intervals do not overlap with each other.

20. The computing system of claim 1, wherein identifying any data units accessed from the working data during the time interval includes identifying at least one of: any data units added to the working data during the time interval, any data units read from the working data during the time interval, or any data units updated within the working data during the time interval.

21. The computing system of claim 1, wherein the memory module includes a volatile memory device.

22. The computing system of claim 1, wherein the storage system includes a non-volatile storage device.

23. A computing system for managing stored data, the computing system including:
a memory module configured to store working data that includes a plurality of data units;
a storage system configured to store recovery data that includes a plurality of sets of one or more data units; and
means for managing transfer of data units between the memory module and the storage system, the managing including:
maintaining an order among the plurality of data units included in the working data, the order defining a first contiguous portion including one or more of the plurality of data units and a second contiguous portion including one or more of the plurality of data units; and
for each of multiple time intervals, identifying any data units accessed from the working data during the time interval, and adding to the recovery data a set of two or more data units including: one or more data units from the first contiguous portion including any accessed data units, and one or more data units from the second contiguous portion including at least one data unit that has been previously added to the recovery data.

24. A method for managing transfer of data units between a memory module of a computing system and a storage system of the computing system, the method including:
storing, in the memory module, working data that includes a plurality of data units;
storing, in the storage system, recovery data that includes a plurality of sets of one or more data units;
maintaining an order among the plurality of data units included in the working data, the order defining a first contiguous portion including one or more of the plurality of data units and a second contiguous portion including one or more of the plurality of data units; and
for each of multiple time intervals, identifying any data units accessed from the working data during the time interval, and adding to the recovery data a set of two or more data units including: one or more data units from the first contiguous portion including any accessed data units, and one or more data units from the second contiguous portion including at least one data unit that has been previously added to the recovery data.

25. The method of claim 24, wherein the managing further includes, for each of multiple intervals of time, removing from the recovery data at least one set of one or more data units for which any data units still included in the working data are stored in at least one other set of one or more data units.

26. The method of claim 24, wherein the managing further includes, for each of the multiple time intervals, identifying any data units removed from the working data during the time interval.

27. The method of claim 26, wherein the second contiguous portion excludes any removed data units.

28. The method of claim 26, wherein the managing further includes, for each of multiple intervals of time, adding to the recovery data information identifying any removed data units.

29. The method of claim 24, wherein identifying any data units accessed from the working data during the time interval includes moving any data units accessed from the working data during the time interval into the first contiguous portion.

30. The method of claim 24, wherein the order among the plurality of data units included in the working data is based on how recently the data units have been accessed.

31. The method of claim 30, wherein the first contiguous portion includes:
a most-recently-accessed data unit of all of the plurality of data units included in the working data, and a least-recently-accessed data unit of a subset of the plurality of data units that have not been added to the recovery data since their most-recent access.

32. The method of claim 31, wherein the second contiguous portion does not overlap with the first contiguous portion.

33. The method of claim 32, wherein the second contiguous portion includes at least one data unit that has been added to the recovery data since its most- recent access.

34. The method of claim 33, wherein the one or more data units from second contiguous portion is limited to a number of data units that is between about half the number of data units in the one or more data units from the first contiguous portion and about twice the number of data units in the one or more data units from the first contiguous portion.

35. The method of claim 34, wherein the first contiguous portion includes data units that have been more recently accessed than any of the data units in the second contiguous portion.

36. The method of claim 24, wherein a time indicating how recently a data unit has been accessed corresponds to a time at which exclusive access to the data unit was initiated.

37. The method of claim 24, wherein a time indicating how recently a data unit has been accessed corresponds to a time at which exclusive access to the data unit was concluded.

38. The method of claim 24, wherein the managing further includes using the recovery data to restore a state of the working data in response to a failure.

39. The method of claim 24, wherein the plurality of data units included in the working data are each associated with a key value.

40. The method of claim 39, wherein at least one of the data units included in the working data includes one or more values accessible based on the key value associated with the data unit.

41. The method of claim 39, wherein the total number of different key values associated with different data units included in the working data is larger than about 1,000.

42. The method of claim 24, wherein the time intervals do not overlap with each other.

43. The method of claim 24, wherein identifying any data units accessed from the working data during the time interval includes identifying at least one of: any data units added to the working data during the time interval, any data units read from the working data during the time interval, or any data units updated within the working data during the time interval.

44. The method of claim 24, wherein the memory module includes a volatile memory device.

45. The method of claim 24, wherein the storage system includes a non- volatile storage device.

46. Software stored in a non-transitory form on a computer-readable medium, for managing transfer of data units between a memory module of a computing system and a storage system of the computing system, the software including instructions for causing the computing system to:
   store, in the memory module, working data that includes a plurality of data units;
   store, in the storage system, recovery data that includes a plurality of sets of one or more data units;
   maintain an order among the plurality of data units included in the working data, the order defining a first contiguous portion including one or more of the plurality of data units and a second contiguous portion including one or more of the plurality of data units; and
   for each of multiple time intervals, identify any data units accessed from the working data during the time interval, and add to the recovery data a set of two or more data units including: one or more data units from the first contiguous portion including any accessed data units, and one or more data units from the second contiguous portion including at least one data unit that has been previously added to the recovery data.

47. The software of claim 46, wherein the managing further includes, for each of multiple intervals of time, removing from the recovery data at least one set of one or more data units for which any data units still included in the working data are stored in at least one other set of one or more data units.

48. The software of claim 46, wherein the managing further includes, for each of the multiple time intervals, identifying any data units removed from the working data during the time interval.

49. The software of claim 48, wherein the second contiguous portion excludes any removed data units.

50. The software of claim 48, wherein the managing further includes, for each of multiple intervals of time, adding to the recovery data information identifying any removed data units.

51. The software of claim 46, wherein identifying any data units accessed from the working data during the time interval includes moving any data units accessed from the working data during the time interval into the first contiguous portion.

52. The software of claim 46, wherein the order among the plurality of data units included in the working data is based on how recently the data units have been accessed.

53. The software of claim 52, wherein the first contiguous portion includes: a most-recently-accessed data unit of all of the plurality of data units included in the working data, and a least-recently-accessed data unit of a subset of the plurality of data units that have not been added to the recovery data since their most-recent access.

54. The software of claim 53, wherein the second contiguous portion does not overlap with the first contiguous portion.

55. The software of claim 54, wherein the second contiguous portion includes at least one data unit that has been added to the recovery data since its most- recent access.

56. The software of claim 55, wherein the one or more data units from second contiguous portion is limited to a number of data units that is between about half the number of data units in the one or more data units from the first contiguous portion and about twice the number of data units in the one or more data units from the first contiguous portion.

57. The software of claim 56, wherein the first contiguous portion includes data units that have been more recently accessed than any of the data units in the second contiguous portion.

58. The software of claim 46, wherein a time indicating how recently a data unit has been accessed corresponds to a time at which exclusive access to the data unit was initiated.

59. The software of claim 46, wherein a time indicating how recently a data unit has been accessed corresponds to a time at which exclusive access to the data unit was concluded.

60. The software of claim 46, wherein the managing further includes using the recovery data to restore a state of the working data in response to a failure.

61. The software of claim 46, wherein the plurality of data units included in the working data are each associated with a key value.

62. The software of claim 61, wherein at least one of the data units included in the working data includes one or more values accessible based on the key value associated with the data unit.

63. The software of claim 61, wherein the total number of different key values associated with different data units included in the working data is larger than about 1,000.

64. The software of claim 46, wherein the time intervals do not overlap with each other.

65. The software of claim 46, wherein identifying any data units accessed from the working data during the time interval includes identifying at least one of: any data units added to the working data during the time interval, any data units read from the working data during the time interval, or any data units updated within the working data during the time interval.

66. The software of claim 46, wherein the memory module includes a volatile memory device.

67. The software of claim 46, wherein the storage system includes a non- volatile storage device.

* * * * *